US012037822B1

(12) United States Patent
Hyun et al.

(10) Patent No.: US 12,037,822 B1
(45) Date of Patent: Jul. 16, 2024

(54) LOCKING MODULE AND LOCKING MODULE ATTACHMENT DEVICE INCLUDING THE SAME

(71) Applicant: Spigen Korea Co., Ltd., Seoul (KR)

(72) Inventors: Chang Hoon Hyun, Seoul (KR); Jae Hong Cho, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 18/459,572

(22) Filed: Sep. 1, 2023

(30) Foreign Application Priority Data

Jan. 13, 2023 (KR) ........................ 10-2023-0005592

(51) Int. Cl.
*E05B 65/52* (2006.01)
*E05B 15/00* (2006.01)
*E05C 1/10* (2006.01)
*E05C 19/02* (2006.01)

(52) U.S. Cl.
CPC ............ *E05C 1/10* (2013.01); *E05B 15/0053* (2013.01); *E05B 65/52* (2013.01); *E05C 19/02* (2013.01)

(58) Field of Classification Search
CPC . A45C 11/00; A45C 13/1076; A45C 13/1084; A45C 2001/001; E05B 15/0053; E05B 15/1607; E05B 73/0023; E05B 65/52; E05B 65/5269; E05B 65/0014; E05B 65/0858; E05C 1/08; E05C 19/02; E05C 16/06; E05C 19/10; B65D 2255/00; B65D 2255/20; B65D 55/04; B65D 46/16; B65D 43/22; B65D 2251/1016; B65D 2251/1033; H04R 1/10
See application file for complete search history.

(56) References Cited

U.S. PATENT DOCUMENTS

| | | | | |
|---|---|---|---|---|
| 11,751,652 B2 * | 9/2023 | Wright | .................. | A45C 13/02 381/386 |
| 2008/0090622 A1 * | 4/2008 | Kim | ........................ | H04M 1/05 455/575.2 |
| 2020/0107110 A1 * | 4/2020 | Ji | .......................... | G01V 3/081 |
| 2021/0029424 A1 * | 1/2021 | Wright | ................. | H04R 1/1025 |

(Continued)

FOREIGN PATENT DOCUMENTS

| | | |
|---|---|---|
| CN | 215379212 U | * 12/2021 |
| CN | 216752045 U | * 6/2022 |

(Continued)

OTHER PUBLICATIONS

Espacenet, machine translation of CN 216960148U, generated Dec. 15, 2023. (Year: 2023).*

(Continued)

*Primary Examiner* — Kristina R Fulton
*Assistant Examiner* — Emily G. Brown
(74) *Attorney, Agent, or Firm* — Bridgeway IP Law Group, PLLC; Jihun Kim

(57) ABSTRACT

A locking module is coupled to first and second bodies that are movably connected to each other to be selectively spaced apart from each other and disposed close to each other, and the locking module includes: a first locking unit configured to be attached to the first body; and a second locking unit configured to be attached to the second body and to be detachably coupled to the first locking unit on the same line.

7 Claims, 9 Drawing Sheets

(56) References Cited

U.S. PATENT DOCUMENTS

| | | | | |
|---|---|---|---|---|
| 2021/0085047 A1* | 3/2021 | Wright | .................. | A45C 13/02 |
| 2022/0000237 A1* | 1/2022 | Mody | .................... | A45C 11/00 |
| 2022/0400824 A1* | 12/2022 | Zhang | ................ | A45C 13/1084 |
| 2023/0269513 A1* | 8/2023 | Cousins | ............... | H04R 1/1083 |
| | | | | 381/171 |

FOREIGN PATENT DOCUMENTS

| | | | | | |
|---|---|---|---|---|---|
| CN | 216960148 | U | * | 7/2022 | |
| KR | 10-2345619 | B1 | | 12/2021 | |
| KR | 10-2355920 | B1 | | 1/2022 | |
| WO | WO-2018100439 | A1 | * | 6/2018 | |
| WO | WO-2020097916 | A1 | * | 5/2020 | |
| WO | WO-2023183505 | A1 | * | 9/2023 | ........... H01F 7/0247 |

OTHER PUBLICATIONS

Anonymous "Nillkin AirPods Lockable Case Switch AirPods Case (KRW 12,652 / Free Shipping)", Internet Pomppu site post (Mar. 20, 2022), https://www.ppomppu.co.kr/zboard/view.php?id=ppomppu8&no=3247 (Year: 2022).*

Espacenet, machine translation of CN 216752045 U, generated Dec. 15, 2023 (Year: 2023).*

Anonymous "Nillkin AirPods Lockable Case Switch AirPods Case (KRW 12,652 / Free Shipping)", Internet Pomppu site post (Mar. 20, 2022), https://www.ppomppu.co.kr/zboard/view.php?id=ppomppu8&no=3247.

* cited by examiner

LOCKING MODULE AND LOCKING MODULE ATTACHMENT DEVICE INCLUDING THE SAME

CROSS-REFERENCE TO RELATED APPLICATION

This application claims the benefit of Korean Patent Application No. 10-2023-0005592 filed on Jan. 13, 2023 which is hereby incorporated by reference herein in its entirety.

BACKGROUND

1. Technical Field

The present disclosure relates to a locking module and a locking module attachment device including the locking module, and more particularly, to a locking module that is attached to a product whose part is selectively spaced apart from the rest of the product and disposed close to the rest of the product and provides a fastening function, and a locking module attachment device including the locking module.

2. Description of the Related Art

Recently, as small portable wireless earphones have been released on the market and are popularly used, charging cases that can safely store wireless earphones and charge the wireless earphones are also sold together with the wireless earphones.

However, conventional charging cases on sale have a problem in that wireless earphones are lost or damaged as the wireless earphones are separated from a charging case when the lid of the charging case is opened by impact. In the case where a separate case covering a charging case is employed, there is a disadvantage in that the aesthetics of the design of a product decreases as the volume and weight of the product increase.

In addition, in the case of cases used for various products as well as cases used for electronic products such as smartphones and tablets, a lid may be easily separated by external impact in a state in which the inner space of a case is sealed with the lid. Accordingly, there is a demand for a technology for improving the fixing force of a lid by adding a separate device for fixing the lid within the range without damaging the exterior of the case.

In connection with this, Korean Patent No. 10-2355920 entitled "Functional Wireless Earphone Case" discloses a technology for improving the fixing force of the lid of a charging case by being coupled to the charging case in a form surrounding the overall charging case for wireless earphones. Korean Patent No. 10-2345619 discloses a "Wireless Earphone Cradle Case Accessory Providing User Convenience."

However, conventional technologies do not disclose a technology for improving the fixing force of a lid while suppressing an increase in the volume and weight of a product case itself.

SUMMARY

An object of the present disclosure is to provide a locking module that is used for a product, including first and second bodies that are movably connected to each other to be selectively spaced apart from each other and disposed close to each other, and strengthens the fastening force of the first and second bodies, and to also provide a locking module attachment device including the locking module.

It is obvious that objects of the present disclosure are not limited to the object mentioned above and other objects not mentioned above may be derived from the following description.

According to an aspect of the present disclosure, there is provided a locking module coupled to first and second bodies that are movably connected to each other to be selectively spaced apart from each other and disposed close to each other, the locking module including: a first locking unit configured to be attached to the first body; and a second locking unit configured to be attached to the second body and to be detachably coupled to the first locking unit on the same line.

The first locking unit may be configured such that portions of one side and the other side of the center of one end thereof are bent forward and surround both sides of a deformation space and the other end thereof extends forward from the center of the one end and is coupled with the second locking unit.

The first locking unit may include: a first fixing member configured to be attached to the first body; and a first fastening member configured such that one end thereof is connected to the top of the front surface of the first fixing member, the other end thereof is spaced apart from the first fixing member at one end and extends into the deformation space, and a first protrusion protruding upward is formed at the other end.

The first fixing member may be configured such that the upper portion of the outer edge thereof is tapered and forms a first inclined surface.

The second locking unit may be configured such that portions of one side and the other side of the center of one end thereof are bent rearward and the other end thereof is formed in a shape connecting the inner surface of the rear of the one end and is coupled to the first locking unit; and, in a state in which the first and second locking units are coupled to each other, one ends of the first and second locking units are formed to be connected to each other and surround the deformation space.

The second locking unit may include: a second fixing member configured to be attached to the second body; and a second fastening member formed to extend rearward from the second fixing member, and provided with a second protrusion protruding downward.

The second fixing member may be configured such that the upper portion of the outer edge thereof is tapered and forms a second inclined surface.

According to another aspect of the present disclosure, there is provided a locking module attachment device that is used for a first body and a second body movably connected to the front of the first body to be selectively spaced apart from the first body and disposed close to the first body, the locking module attachment device including: a locking module including a first locking unit configured such that one end thereof is attached to the first body, and a second locking unit configured such that one end thereof is formed to be attached to the second body and the other end thereof is formed to be detachably coupled to the other end of the first locking unit; and a jig configured such that one end thereof is formed to be detachably coupled to portions of upper edges and side surfaces of the first and second locking units and the other end thereof is formed to extend downward from the one end and surround the first and second bodies; wherein the jig guides the first and second locking units, coupled to each other, to be attached to specific positions of the first and second bodies adjacent to each other while coming into close contact with the first and second bodies.

The first locking unit may be configured such that portions of one side and the other side of the center of one end thereof are bent forward and surround both sides of a deformation space and the other end thereof extends forward from the center of the one end and is coupled with the second locking unit.

The first locking unit may include: a first fixing member configured to be attached to the first body; and a first fastening member configured such that one end thereof is connected to the top of the front surface of the first fixing member, the other end thereof is spaced apart from the first fixing member at one end and extends into the deformation space, and a first protrusion protruding upward is formed at the other end.

The first fixing member may be configured such that the upper portion of the outer edge thereof is tapered and forms a first inclined surface and a first side surface, in which a groove into which a portion of the jig is inserted is formed, is provided beneath the first inclined surface.

The second locking unit may be configured such that portions of one side and the other side of the center of one end thereof are bent rearward and the other end thereof is formed in a shape connecting the inner surface of the rear of the one end and is coupled to the first locking unit; and, in a state in which the first and second locking units are coupled to each other, one ends of the first and second locking units may be formed to be connected to each other and surround the deformation space.

The second locking unit may include: a second fixing member configured to be attached to the second body; and a second fastening member formed to be connected to the second fixing member and extend rearward, and provided with a second protrusion protruding downward.

The second fixing member may be configured such that the upper portion of the outer edge thereof is tapered and forms a second inclined surface and a second side surface, in which a groove into which a portion of the jig is inserted is formed, is provided beneath the second inclined surface.

The jig may include: a pressing part configured such that the bottom surface thereof is formed in a shape surrounding the locking module to form a plane along with the bottom surfaces of the first and second fixing members, a portion of the upper end of the inner surface thereof protrudes and comes into close contact with the first and second inclined surfaces, and a protrusion inserted into the groove is formed on the inner surface; a jig body formed to extend downward from the outside of the pressing unit and surround the first and second bodies; and a guide part formed such that the bottom surface thereof comes into close contact with the first and second bodies together with the bottom surface of the pressing part.

The locking module attachment device may further include a first protective member configured to protect the bottom surface of an adhesive member formed on the bottom surface of the locking module.

The locking module attachment device may further include a second protective member configured to protect the bottom surface of an adhesive member formed on the top of the jig.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
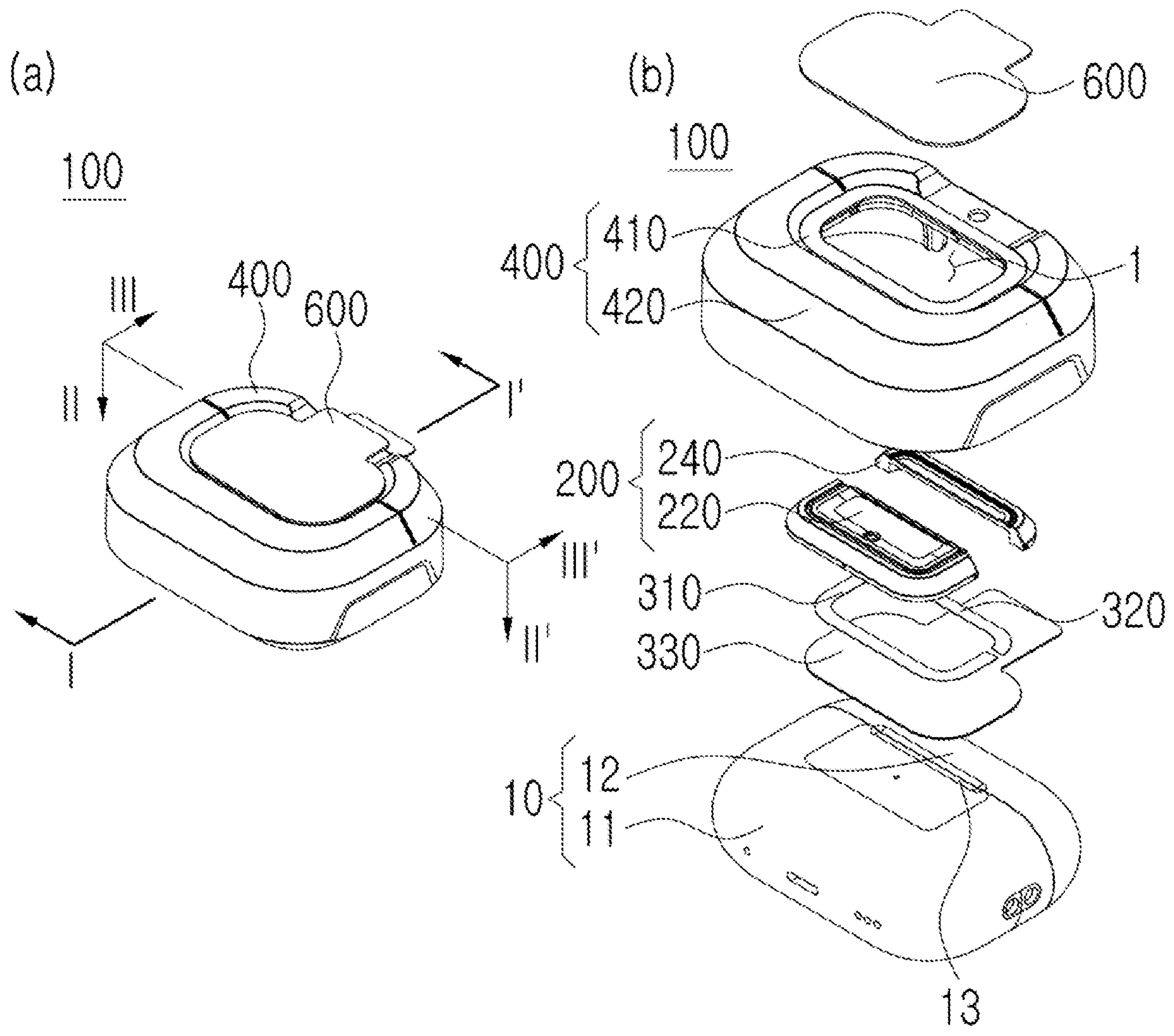
FIG. 1 is perspective and exploded perspective views of a locking module attachment device according to an embodiment of the present specification.

The configurations, operations and effects of a locking module and a locking module attachment device including the locking module according to embodiments will be described below with reference to the accompanying drawings. For reference, in the accompanying drawings, each component is omitted or schematically illustrated for convenience and clarity of description, and the size of each component does not reflect the actual size thereof. Furthermore, like reference numerals denotes like components throughout the present specification, and some reference numerals for like components may be omitted in each of the drawings.

As shown in FIGS. 1 to 9, a locking module attachment device 100 includes a locking module 200, a first adhesive member 310, a second adhesive member 320, a first protective member 330, a jig 400, and a second protection member 600.

The locking module attachment device 100 is used to rapidly, accurately, and conveniently attach the locking module 200 to a specific position of a product 10 in which an electronic product such as wireless earphones is stored and charged.

The product 10 includes a first body 11 and a second body 12. The second body 12 is detachably coupled to or detached from the first body 11 through rotation to seal the electronic product stored therein from the outside or to open it to the outside.

The electronic product is accommodated only in either the first body 11 or the second body 12. Alternatively, the electronic product may be accommodated in the product 10 in such a manner that a part of the electronic product is stored in the first body 11 and the rest of the electronic product is stored in the second body 12.

In a state in which the first and second bodies 11 and 12 are in close contact with each other to seal the space inside the product 10, the top surfaces of the first and second bodies 11 and 12 are connected to each other to form a flat surface.

A top groove 13 is formed by depressing portions of the top surfaces of the first and second bodies 11 and 12 extending to both sides in a state in which the first and second bodies 11 and 12 are in close contact with each other. The top groove 13 is used to detach the second body 12 from the first body 11.

Meanwhile, the first and second bodies 11 and 12 may be coupled by moving through sliding rather than rotation. The first and second bodies 11 and 12 may have a structure that exposes the electronic product to the outside in the state of being coupled to each other. The first and second bodies 11 and 12 may be connected to each other so that they can be moved to be selectively spaced apart from each other and disposed close to each other.

Although the product 10 disclosed in FIG. 1 is a charging case used for wireless earphones, the product 10 may include a foldable terminal, a case product with a lid, and a case product with a sliding door.

More specifically, the product 10 may be formed in any one of a structure including first and second bodies that are rotatably coupled to each other, a structure including first and second bodies that are slidably coupled to each other, and a structure including first and second bodies that are separate from each other but are selectively brought into close contact with each other and spaced apart from each other through a separate bracket.

The locking module 200 includes first and second locking units 220 and 240 that are separate from each other. The first and second locking units 220 and 240 are attached to the top surfaces of the first and second bodies 11 and 12, respectively.

In a state in which the locking module 200 is attached to the product 10, when the second body 12 is rotated and spaced apart from the first body 11, the first and second locking units 220 and 240 detachably coupled to each other are detached from each other, and the electronic product is exposed to the outside.

In a state in which the locking module 200 is attached to the product 10, when the second body 12 is rotated and moved to a position adjacent to the first body 11, the first and second locking units 220 and 240 are fastened to each other, and the electronic product is safely stored inside the product 10 by the combination of the first and second bodies 11 and 12 through the locking module 200.

The first adhesive member 310 is formed in a shape in which one side and the other side of a central portion formed in the shape of a film extending to both sides are vertically bent toward the front. The top surface of the first adhesive member 310 is attached to the bottom surface of the first locking unit 220.

The first adhesive member 310 is attached to the top surface located in the front and center of the first body 11 in a state of being separated from the first protective member 330 attached beneath it, thereby firmly attaching the first locking unit 220 to the first body 11.

The second adhesive member 320 is formed in a shape in which portions of one side and the other side of a central portion formed in the shape of a film extending to both sides are vertically bent toward the rear. The top surface of the second adhesive member 320 is attached to the bottom surface of the second locking unit 240.

The second adhesive member 320 is attached to the top surface located in the rear and center of the second body 12 in a state of being separated from the first protective member 330 attached underneath it, thereby firmly attaching the second locking unit 240 to the second body 12.

Accordingly, the first and second adhesive members 310 are attached to the bottom surfaces of the first and second locking units 220 and 240, respectively, and are used as adhesive members for attaching the product 10 and the first and second locking units 220 and 240 to each other at the bottoms of the first and second locking units 220 and 240.

In a state in which the first and second bodies 11 and 12 come into close contact with each other and seal the product 10, the first and second adhesive members 310 and 320 are disposed at adjacent positions to be spaced apart from each other, and the overall shape is formed in the shape of a rectangular ring with corners tapered.

One end of the first protective member 330 is formed in the shape of a rectangular film with corners tapered in an arc shape, and the top surface of the one end of the first protective member 330 is easily detachably attached to the bottom surface of the first and second adhesive members 310 and 320. The other end of the first protective member 330 extends from the center of the front of one end toward the front by a predetermined distance in a rectangular shape smaller than that of the one end.

When the other end of the first protective member 330 is moved downward while being held with one hand, one end of the first protective member 330 is separated from the first and second adhesive members 310 and 320, and the adhesive bottom surfaces of the first and second adhesive members 310 and 320 are exposed to the outside.

The bottom surface of one end of the jig 400 is detachably coupled to the locking module 200 in a state of being in close contact with the top surface of the locking module 200. The other end of the jig 400 is formed to extend downward from the edge and surround the product 10.

One end of the second protective member 600 is formed in the shape of a rectangular film with corners tapered in an arc shape, and the bottom surface of the one end of the second protective member 600 is attached to the top surface of one end of the jig 400 and a portion of the top surface of the locking module 200. The other end of the second protective member 600 extends from the front center of the one end toward the front by a predetermined distance in a rectangular shape smaller than that of the one end.

Figure 9:
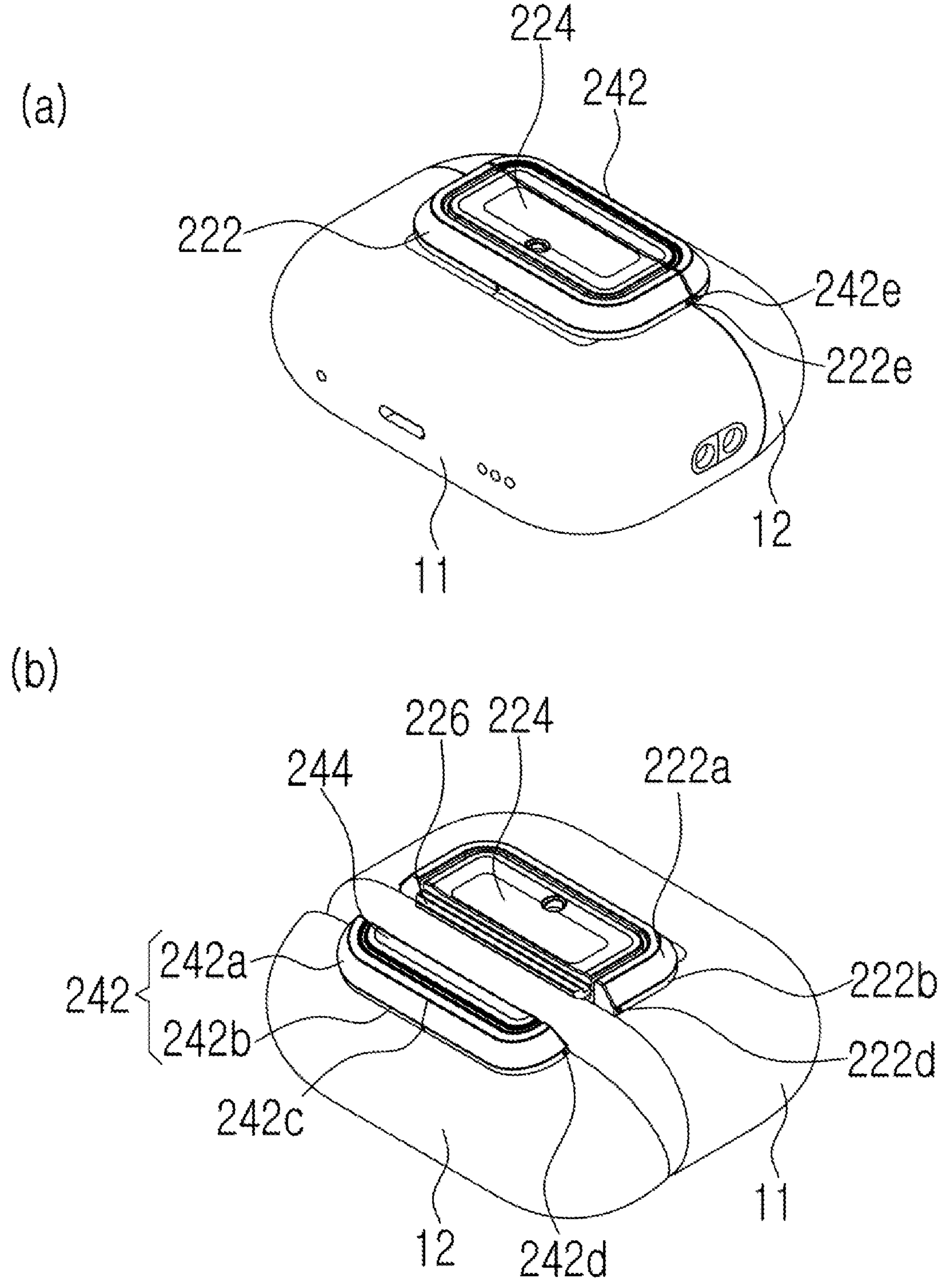
FIG. 9 is a use state diagram illustrating states in which first and second locking units are coupled to or separated from each other in a state in which the locking module attachment device of FIG. 1 is coupled to the product case.

Referring to FIGS. 1 and 9, in the process of attaching the locking module 200 to the product 10 through the locking module attachment device 100, the first protective member 330 is separated from the locking module attachment device 100 and lowered toward the product 10, the first and second adhesive members 310 and 320 are attached to the product 10, and the locking module 200 is attached to the product 10 through the first and second adhesive members 310 and 320.

In a process in which the locking module 200 and the jig 400 are lowered and the locking module 200 is attached to the product 10, a portion of the inner surface of the jig 400 is lowered while being in close contact with the product 10, and thus guides the locking module 200 to a specific position located on the top of the product 10.

A portion of the locking module 200 is attached to the top surface of the first body 11 adjacent to a first opening through which a first space inside the first body 11 is connected to the outside, and the rest of the locking module 200 is attached to the top surface of the second body 12 adjacent to the first opening in a separated state.

More specifically, the bottom surface of the first locking unit 220 is attached to the top surface of the first body 11 through the first adhesive member 310, and the bottom surface of the second locking unit 240 is attached to the top surface of the second body 12 through the second adhesive member 320.

The locking module 200 is pressed downward through the second protective member 600, and the second protective member 600 is detached from the locking module 200 in a state in which the locking module 200 is firmly attached through the first and second adhesive members 310 and 320.

When the jig 400 is moved upward from the locking module 200 and the product 10 in a state in which the second protective member 600 is detached from the locking module 200, the jig 400 is detached from the locking module 200, and the locking module 200 is accurately attached to a specific position of the product 10.

Referring to FIGS. 2 to 5, the locking module 200 includes the first locking unit 220 and the second locking unit 240. The first locking unit 220 includes a first fixing member 222, a first fastening member 224, and a first protrusion 226, and the second locking unit 240 includes a second fixing member 242, a second fastening member 244, and a second protrusion 246.

One end of the first locking unit 220 is formed in a shape in which portions of both sides of the center thereof are bent forward. The other end of the first locking unit 220 extends in a plate shape by a predetermined distance forward from the center of the one end, and a portion of the other end protrudes upward and is detachably coupled with the second locking unit 240.

More specifically, the first fixing member 222 is formed such that portions of one side and the other side of the center thereof are vertically bent toward the front and surround both sides and rear of a deformation space 5. The upper portion of the outer edge of the first fixing member 222 is tapered and forms a first inclined surface 222*a*. A first side surface 222*b* is formed beneath the first inclined surface 222*a*.

In the center of the rear surface of the first side surface 222*b*, a portion is depressed forward and forms a first groove 222*c*. At positions in front of one side and the other side of the first side surface 222*b*, portions of the one side and the other side of the first side surface 222*b* are depressed and form second and third grooves 222*d* and 222*e*, respectively.

One end of the first fastening member 224 is formed in the shape of a rectangular plate with corners formed in an arc shape, and is elastically and vertically movably coupled to the top portion of the center of the first fixing member 222. The other end of the first fastening member 224 extends forward by a predetermined distance in a state in which both side surfaces thereof are spaced apart from the first fixing member 222 in the deformation space 5.

Figure 4:
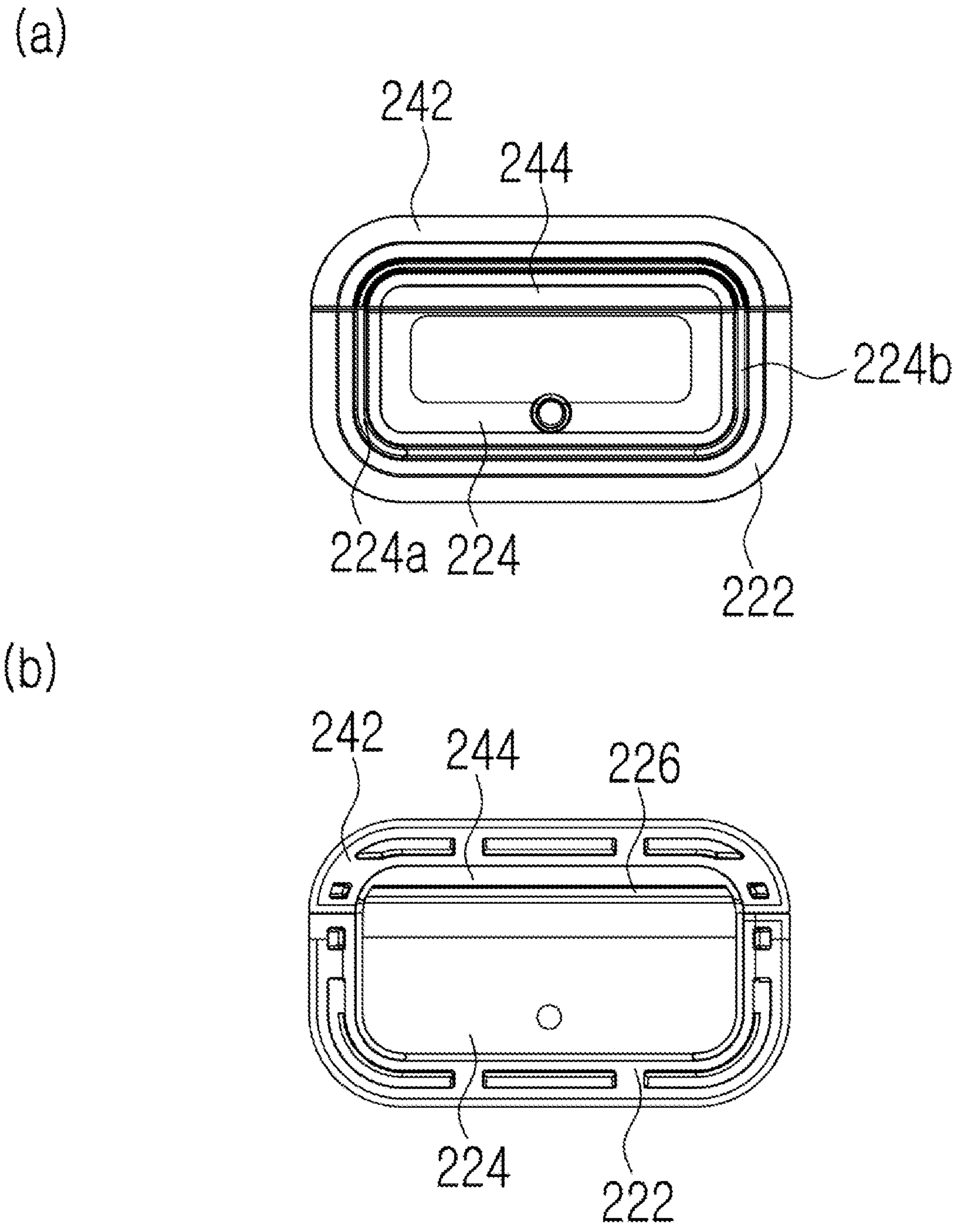
FIG. 4 shows plan and bottom views of the locking module of FIG. 1.

Both side surfaces of the first fastening member 224 are spaced apart from one side and the other side of the first fixing member 222 located on both sides with the side grooves 224*a* and 224*b* shown in FIG. 4 interposed therebetween, in the deformation space 5.

Figure 2:
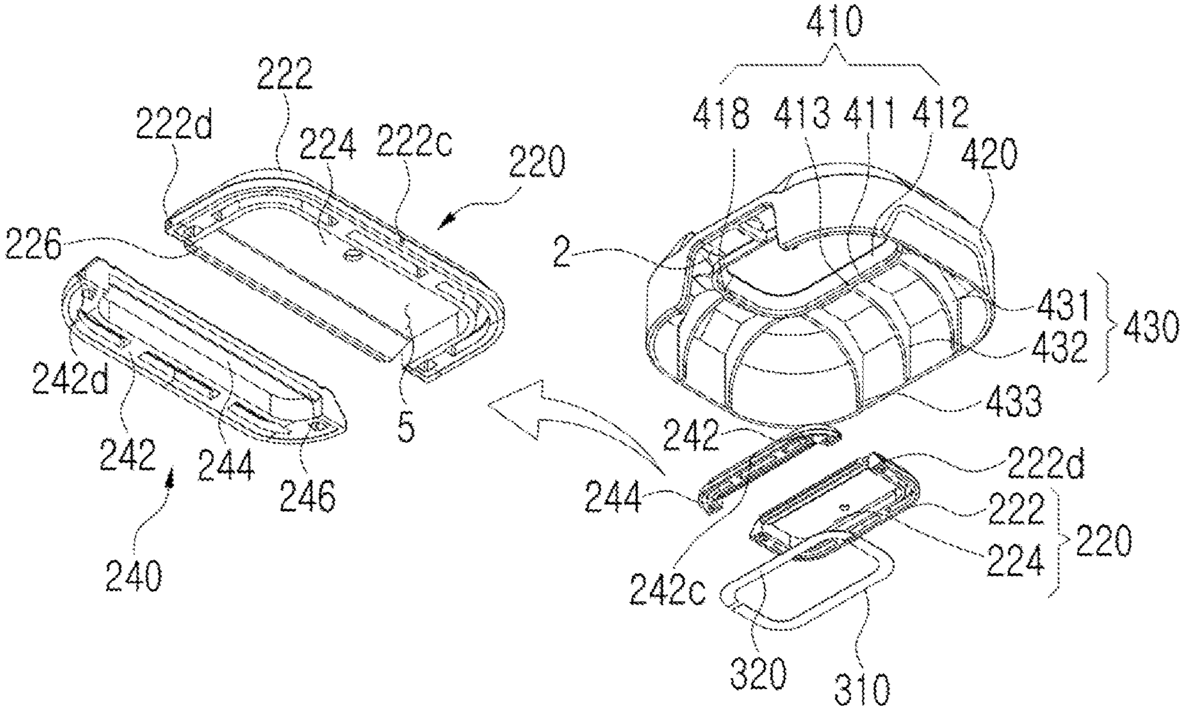
FIGS. 2 and 3 are exploded perspective views showing the locking module attachment device of FIG. 1 as viewed from different angles.
Figure 3:
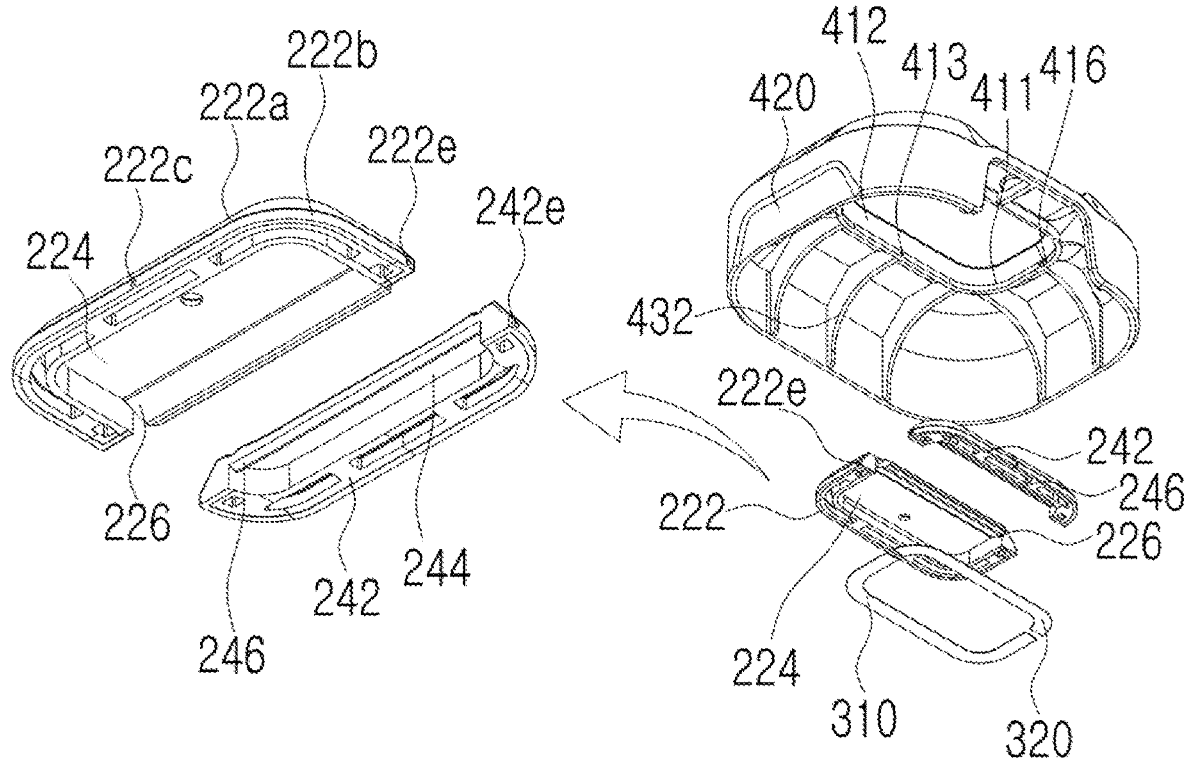
Figure 5:
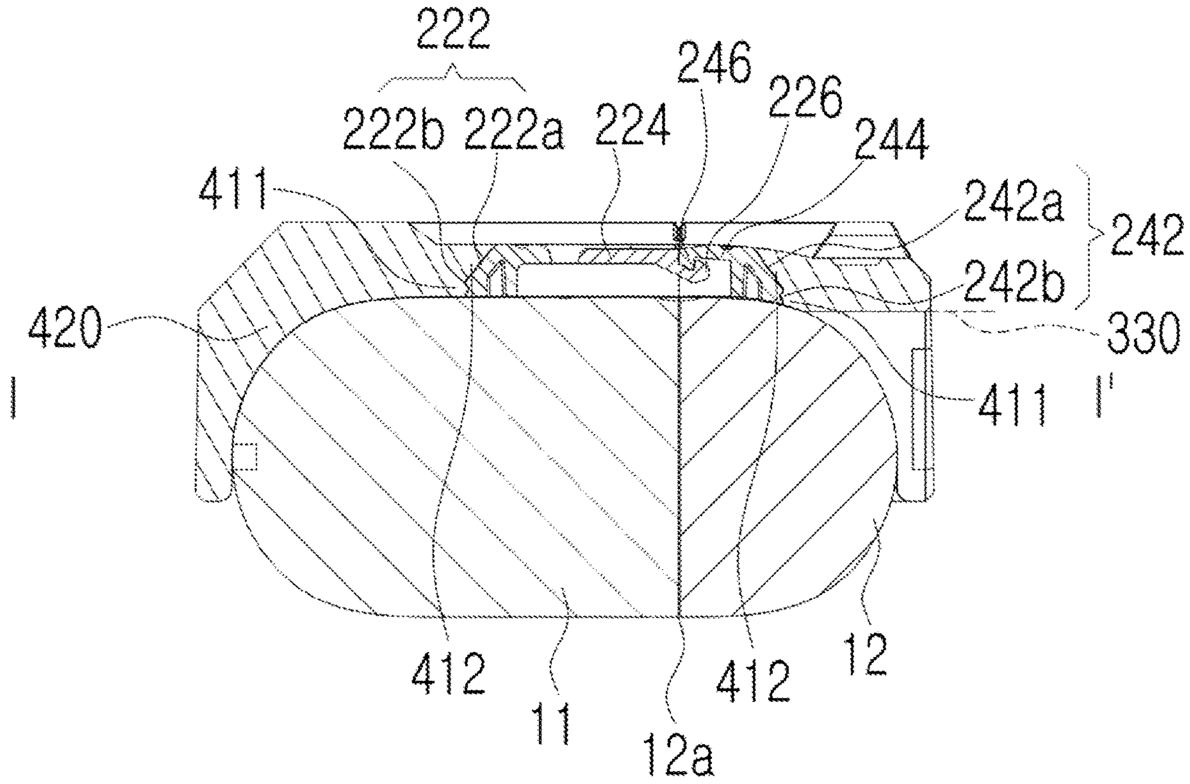
FIG. 5 is a sectional view of the locking module attachment device of FIG. 1 taken along line I-I' of FIG. 1.

Referring to FIGS. 2, 3 and 5, one end of the first protrusion 226 extends forward and downward by a predetermined distance from the bottom of the other end of the first fastening member 224. The other end of the first protrusion 226 is bent and extends upward from the one end and surrounds a first catch groove formed in the top.

One end of the second locking unit 240 is formed in a shape in which portions of both sides of the center thereof are bent rearward. The other end of the second locking unit 240 is formed in a plate shape connecting the inner surface of the rear of the one end, and a portion of the other end of the second locking unit 240 protrudes downward and is detachably coupled to the other end of the first locking unit 220.

When one ends of the first and second locking units 220 and 240 are attached to the first and second bodies 11 and 12 through the pressing and guiding of the jig 400, the one ends of the first and second locking units 220 and 240 are connected to each other and formed in a shape surrounding the deformation space 5.

More specifically, the second fixing member 242 is formed such that portions of one side and the other side of the center thereof are vertically bent toward the rear. The upper portion of the outer edge of the second fixing member 242 is tapered and forms a second inclined surface 242*a*. A second side surface 242*b* is formed beneath the second inclined surface 242*a*.

Due to the shape of the second fixing member 242, the bottom surface of the second fixing member 242 is stably attached to the top surface of the second body 12 while surrounding a portion in front of the top groove 13. In this case, there is an advantage in that the fastening force between the first and second fastening members 224 and 244 is strengthened.

A portion of the second side surface 242*b* is depressed in the center of the front of the second side surface 242*b* and forms a fourth groove 242*c*. Portions of one side and the other side of the second side surface 242*b* are depressed on the rears of the one side and the other side of the second side surface 242*b*, respectively, and form fifth and sixth grooves 242*d* and 242*e*, respectively.

One end of the second fastening member 244 is formed in a plate shape and connected to the rear and top of the second fixing member 242. The other end of the second fastening member 244 extends from the one end to positions corresponding to the rear surfaces of one side and the other side of the second fixing member 242 while maintaining a state in which both side surfaces are connected to the inner surface of the rear of the second fixing member 242.

The second protrusion 246 protrudes downward from the other end of the second fastening member 244 by a predetermined distance and surrounds the second catch groove formed in the front. In a state in which the first and second locking units 220 and 240 are fastened to each other, the second protrusion 246 is inserted into the first catch groove. The first protrusion 226 is inserted into the second catch groove.

When the bottom surfaces of the first and second fixing members 222 and 242 are coupled to the top surfaces of the first and second bodies 11 and 12 through the pressing and guiding of the jig 400, the first and second fixing members 222 and 242 are formed to be connected to each other and surround the deformation space 5 in a rectangular shape with corners tapered in an arc shape.

Since the first and second fixing members 222 and 242 surround the deformation space 5, there are advantages in that foreign materials are prevented from penetrating into the deformation space 5, the first fastening member 224 moves smoothly up and down in the deformation space 5 regardless of the environment in which the product 10 is located, and the engagement or separation between the first and second fastening members 224 and 244 is stably performed.

Referring to FIGS. 5 and 9, in a state in which the second body 12 is rotated and coupled to the first body 11, the top surfaces of the first and second bodies 11 and 12 are arranged on the same horizontal line, and the first and second protrusions 226 and 246 are coupled to each other in a protrusion engagement manner over the first and second bodies 11 and 12.

In a state in which the first and second bodies 11 and 12 are brought into close contact with each other and coupled to each other, a portion of the bottom surface of the rear of the first fixing member 222 is attached to the center of the top of the first body 11, and the first protrusion 226 is coupled with the second protrusion 246 in a protrusion engagement manner over the second body 12 and is disposed spaced apart from each other over the first and second bodies 11 and 12.

Referring to FIG. 5, in a state in which the first and second bodies 11 and 12 are brought into close contact with each other and coupled to each other, a portion of the bottom surface of the front of the second fixing member 242 is attached to the center of the top of the second body 12, the second protrusion 246 is engaged with the first protrusion 226 over the second body 12, and the front-rear thickness of the second fixing member 242 is formed to be smaller than the front-rear thickness of the first fixing member 222.

Referring to FIGS. 4 and 9, in a state in which the first and second bodies 11 and 12 are brought into close contact with each other and coupled to each other, the top surfaces of the first and second fixing members 222 and 242 are connected to each other and formed in the shape of a rectangular frame with corners tapered in an arc shape. Accordingly, there is an advantage in that the human body is prevented from being damaged.

In a state in which the first and second bodies 11 and 12 are brought into close contact with each other and coupled to each other, the first inclined surface 222*a* and the second inclined surface 242*a* are formed to be connected to each other and surround the deformation space 5.

Referring to FIGS. 5 and 9, the first fastening member 224 is lowered to separate the first protrusion 226 from the second protrusion 246. When the second body 12 is moved forward and downward around a lower rotation shaft 12*a* formed at the bottom of the second body 12, the inside of the product 10 is opened.

Conversely, in a state in which the inside of the product 10 is opened, when the second body 12 is brought into close contact with the first body 11 by moving the second body 12 rearward and upward around the lower rotation shaft 12*a*, the second protrusion 246 is moved rearward while pushing the upper inclined surface formed on the top of the first protrusion 226 downward, and is coupled with the first protrusion 226 while being inserted into the first catch groove.

Referring to FIGS. 1 to 7, the jig 400 includes a pressing part 410, a jig body 420, and a guide part 430.

One end of the jig 400 is formed in a shape surrounding the edge of the locking module 200, and the bottom surface of the jig 400 comes into close contact with the top of the edge of the locking module 200. The other end of the jig 400 extends outward and downward from the outside of the one end, is formed in the shape of a rectangular tube with corners tapered, and surrounds the locking module 200, the first adhesive member 310, the second adhesive member 320, the first protective member 330, and the product 10.

Referring to FIGS. 2, 3, 5 and 6, the pressing part 410 includes a side support member 411, an inclined surface pressing member 412, a first projection 413, a second projection 414, and third projections 415, 416, 417, and 418.

One end of the pressing part 410 is formed in a rectangular ring shape having outer corners tapered and surrounding a first hollow 1. The other end of the pressing part 410 extends by a predetermined distance while the thickness of the upper and lower portions decreases toward the first hollow 1 from the top of the one end, so that a lower inclined surface is formed on the inside thereof.

More specifically, referring to FIG. 5, the side support member 411 is formed in the shape of a rectangular ring surrounding the first hollow 1, and comes into close contact with the first and second side surfaces 222*b* and 242*b* in a state in which the locking module 200 and the jig 400 are coupled to each other.

The inclined surface pressing member 412 extends by a predetermined distance while the upper-lower thickness thereof decreases toward the first hollow 1 over the side support member 411, so that the sectional shape thereof is formed in a triangular shape. Accordingly, the lower inclined surface facing the first hollow 1 and being in close contact with the first and second inclined surfaces 222*a* and 242*a* is formed.

In a state in which the locking module 200 and the jig 400 are lowered such that the first and second adhesive members 310 and 320 come into close contact with the first and second bodies 11 and 12, respectively, the lower inclined surface presses the first and second inclined surfaces 222*a* and 242*a*. Accordingly, the attaching force between the first and second fixing members 222 and 242 and the first and second bodies 11 and 12 is strengthened.

Referring to FIGS. 2, 3, 5, 6 and 7, the first protrusion 413 is formed to protrude in a hemispherical shape forward from the inner surface of the center of the rear of the side support member 411 (the rear of the first hollow 1). In a state where the locking module 200 and the jig 400 are coupled to each other, the first protrusion 413 is inserted into the first groove 222*c*.

Figure 6:
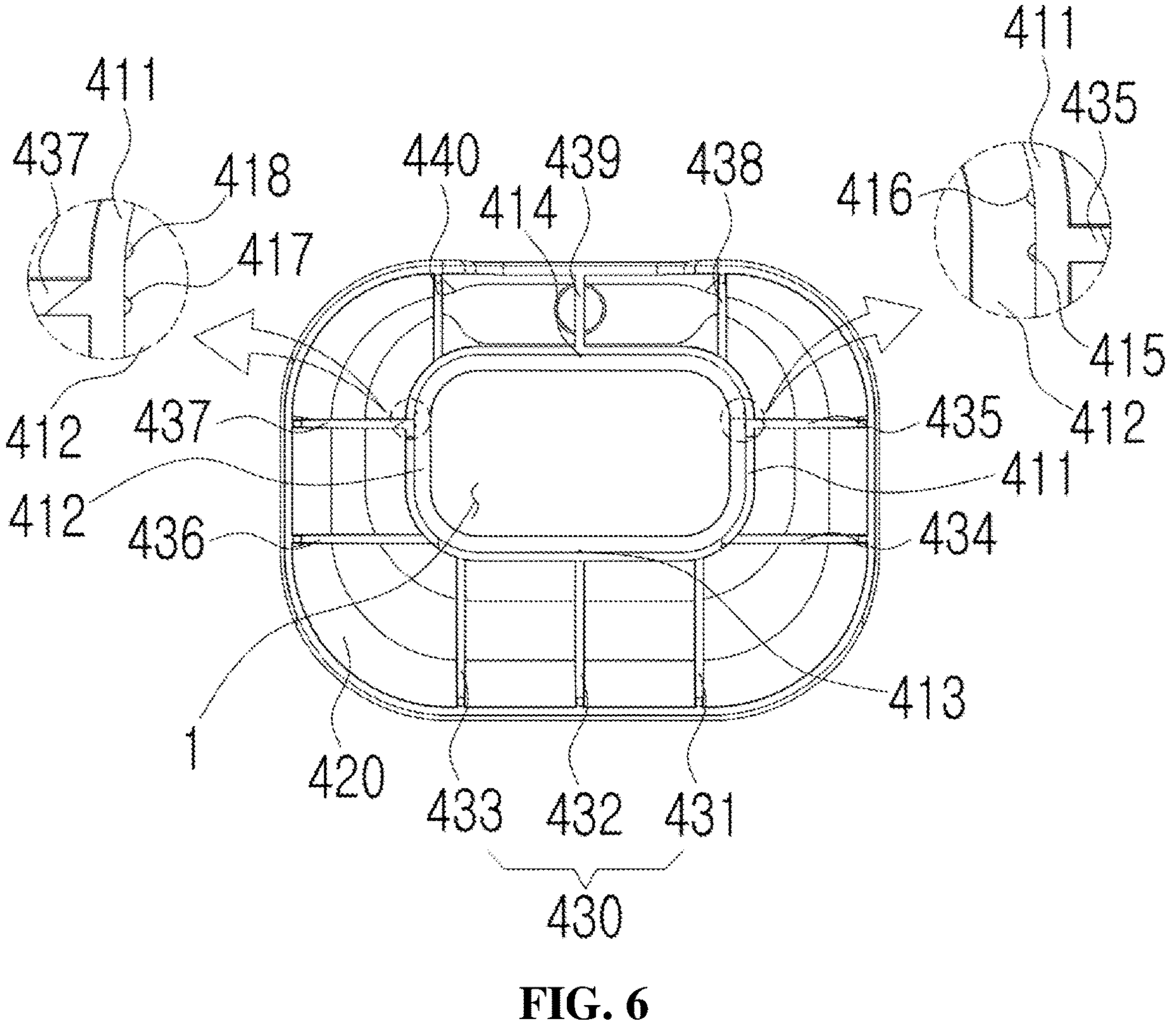
FIG. 6 is a bottom view of the jig of FIG. 1 as viewed from below.
Figure 7:
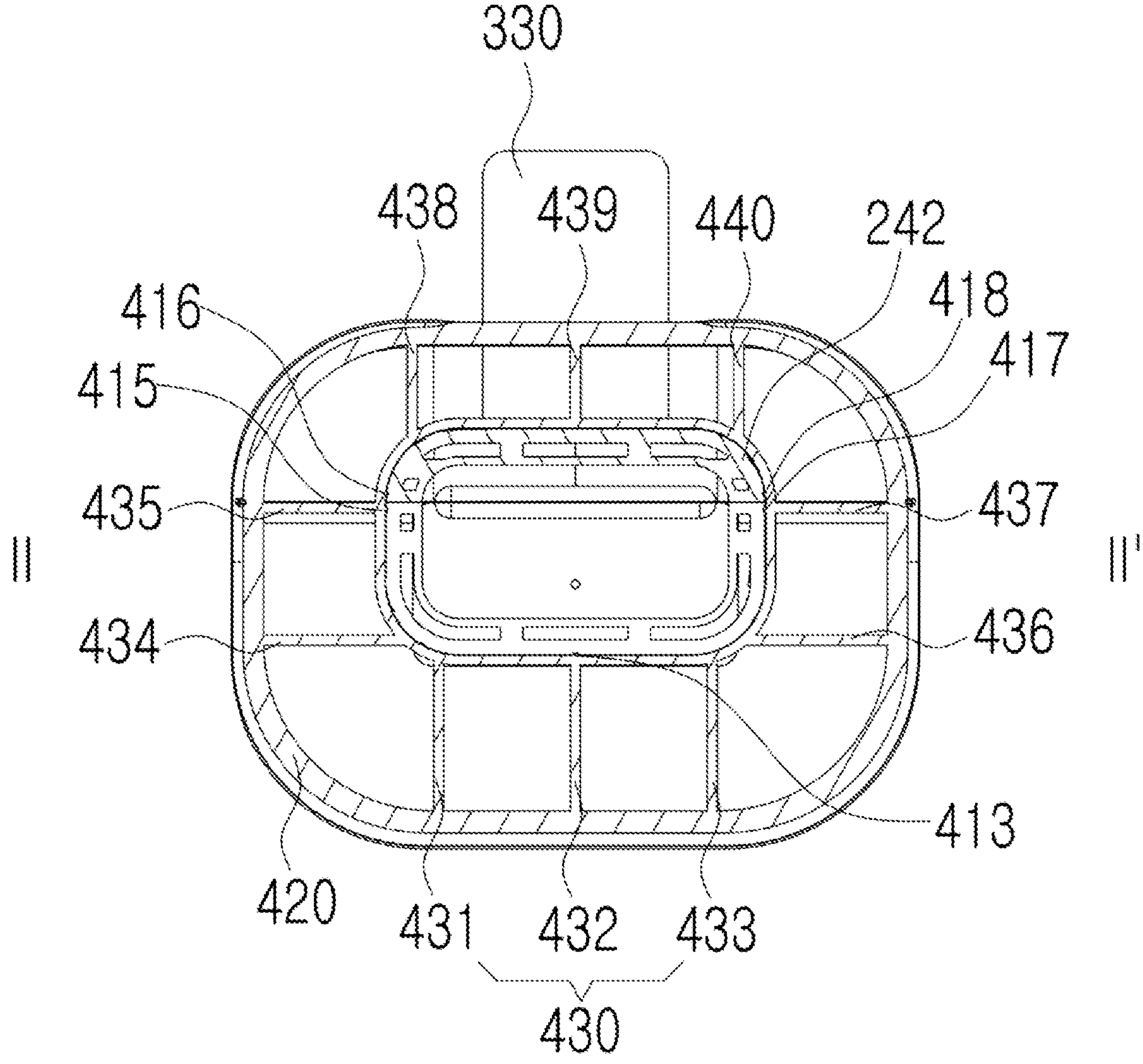
FIG. 7 is a sectional view of the locking module attachment device of FIG. 1 taken along line II-IT of FIG. 1.
Figure 8:
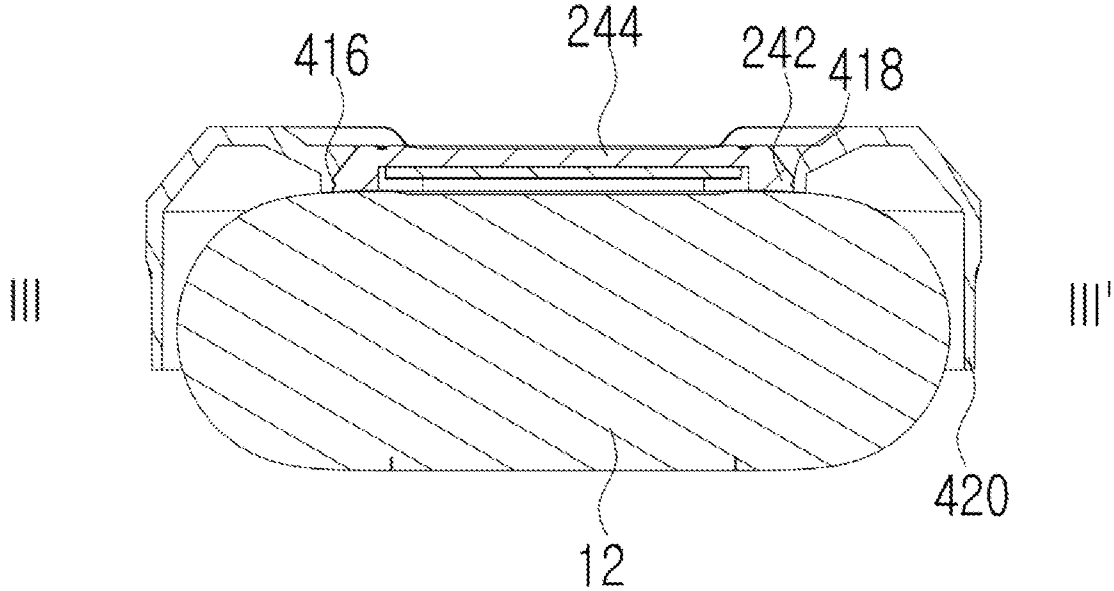
FIG. 8 is a sectional view of the locking module attachment device and a product case taken along line II-III' in a state in which the locking module attachment device of FIG. 1 is coupled to the product case.

Referring to FIG. 6, the second protrusion 414 is formed to protrude in a hemispherical shape rearward from the inner surface of the center of the front of the side support member 411 (the front of the first hollow 1). In a state in which the locking module 200 and the jig 400 are coupled to each other, the second protrusion 414 is inserted into a fourth groove 242*c* (shown in FIG. 2) formed in the front of the second fixing member 242.

Referring to FIG. 6, the third protrusion 416 is formed to protrude in a hemispherical shape from the inner surface of one side of the side support member 411 on the front of the third protrusion 415 toward the other side. In a state in which the locking module 200 and the jig 400 are coupled to each other, the third protrusion 416 is inserted into the fifth groove 242*d* (shown in FIG. 2) of the second fixing member 242.

Referring to FIG. 6, the third protrusion 417 is formed to protrude in a hemispherical shape from the inner surface of the other side of the side support member 411 (the other side of the first hollow 1) toward the one side and the third protrusion 415. In a state in which the locking module 200 and the jig 400 are coupled to each other, the third protrusion 417 is inserted into the third groove 222*e* (shown in FIG. 3) of the first fixing member 222.

Referring to FIG. 6, the third protrusion 418 is formed to protrude in a hemispherical shape from the inner surface of the other side of the side support member 411 on the front side of the third protrusion 417 toward the one side and the third protrusion 416. In a state in which the locking module 200 and the jig 400 are coupled to each other, the third protrusion 418 is inserted into the sixth groove 242*e* (shown in FIG. 3).

Accordingly, the first and second fixing members 222 and 242 are fixed to the side support member 411 through the first protrusion 413, the second protrusion 414, and the third protrusion 415, 416, 417, and 418 formed on the side support member 411. Therefore, there is an advantage in that the locking module 200 is prevented from being separated from the jig 400 while the locking module 200 and the jig 400 are lowered toward the product 10.

Furthermore, there is an advantage in that, in the process of attaching the locking module 200 and the product 10 by moving the locking module 200 and the jig 400 downward, the first protrusion 413 applies the pressure, transmitted from the jig 400, to the first fixing member 222 so that the bottom surface corresponding to the center of the first fixing member 222 is firmly attached to the top surface of the first body 11.

Furthermore, there is an advantage in that, in the process of attaching the locking module 200 and the product 10 by moving the locking module 200 and the jig 400 downward, the second protrusion 414 applies the pressure, transmitted from the jig 400, to the second fixing member 242 so that the bottom surface corresponding to the center of the second fixing member 242 is firmly attached to the top surface of the second body 12.

Furthermore, there is an advantage in that, in the process of attaching the locking module 200 and the product 10 by moving the locking module 200 and the jig 400 downward, the third protrusion 415 applies the pressure, transmitted from the jig 400, to the first fixing member 222 so that the bottom surface of the front of a portion of one side of the first fixing member 222 is firmly attached to the top surface of the first body 11.

Furthermore, there is an advantage in that, in the process of attaching the locking module 200 and the product 10 by moving the locking module 200 and the jig 400 downward, the third protrusion 416 applies the pressure, transmitted from the jig 400, to the second fixing member 424 so that the bottom surface of the rear of a portion of one side of the second fixing member 242 is firmly attached to the top surface of the second body 12.

Furthermore, there is an advantage in that, in the process of attaching the locking module 200 and the product 10 by moving the locking module 200 and the jig 400 downward, the third protrusion 417 applies the downward pressure, transmitted from the jig 400, to the first fixing member 222 so that the bottom surface of the front of a portion of the other side of the first fixing member 222 is firmly attached to the top surface of the first body 11.

Furthermore, there is an advantage in that, in the process of attaching the locking module 200 and the product 10 by moving the locking module 200 and the jig 400 downward, the third protrusion 418 applies the downward pressure, transmitted from the jig 400, to the second fixing member 242 so that the bottom surface of the rear of a portion of the other side of the second fixing member 242 is firmly attached to the top surface of the second main body 12.

Furthermore, there is an advantage in that the first protrusion 413, the second protrusion 414, and the third protrusions 415, 416, 417, and 418 effectively transmit the downward pressure, generated by the lowering of the jig 400, to the first and second fixing members 222 and 242 in association with the inclined surface pressing member 412, so that the first and second fixing members 222 and 242 and the first and second bodies 11 and 12 are rapidly and strongly attached.

Referring to FIGS. 2, 3 and 5, one end of the jig body 420 extends from the outer surface of the pressing part 410 toward the outside by a predetermined distance. The other end of the jig body 420 is vertically bent downward and extends to the lower portions of the side surfaces of the first and second bodies 11 and 12 and surrounds portions of the first and second bodies 11 and 12. A portion of the front of the jig body 420 is depressed and forms a second hollow 2 connecting the inner and outer spaces of the product 10.

Referring to FIGS. 2, 3 and 6, the guide part 430 includes first ribs 431, 432 and 433, second ribs 434 and 435, third ribs 436 and 437, and fourth ribs 438, 439 and 440.

One end of the guide part 430 extends radially by a predetermined distance outward from the outside of the bottom of one end of the pressing part 410 inside the jig body 420. The other end of the guide part 430 is bent and extends downward from the one end. In a state in which the bottom of the locking module 200 coupled with the jig 400 is in close contact with the product 10, the inner surfaces of the one end and the other end of the guide part 430 are in close contact with the outer surface of the top of the product 10.

More specifically, referring to FIGS. 2, 3 and 6, one end of the first rib 431 is formed in the shape of a vertical plate extending forward and backward and being perpendicular to the ground and is connected to the rear surface of one side of the side support member 411 and the inner surface of the jig body 420. The other end of the first rib 431 is bent downward from the one end and extends to the edge of the bottom of the other end of the jig body 420. The bottom surface is formed in an arc shape and comes into close contact with the outer surface of the first body 11.

One end of the first rib 432 is formed in the shape of a vertical plate extending forward and backward, and is connected to the center of the rear surface of the side support member 411 and the inner surface of the jig body 420. The other end of the first rib 432 is bent downward from the one end and extends to the edge of the bottom of the other end of the jig body 420. The bottom surface of the first rib 432 is formed in an arc shape and comes into close contact with the outer surface of the first body 11.

Referring to 6 and 7, there is an advantage in that one end of the first rib 432 is connected to the rear surface of the side support member 411 corresponding to the rear of the first protrusion 413 and suppresses the deformation of the side support member 411, so that the first protrusion 413 is prevented from being separated from the first groove 222*c* due to the deformation of the side support member 411 in the process of lowering the jig 400.

One end of the first rib 433 is formed in the shape of a vertical plate extending forward and backward, and is connected to the rear surface of the other side of the side support member 411 and the inner surface of the jig body 420. The other end of the first rib 433 is bent downward from the one end and extends to the edge of the bottom of the other end of the jig body 420. The bottom surface of the first rib 433 is formed in an arc shape and comes into close contact with the outer surface of the first body 11.

One end of the second rib 434 is formed in the shape of a vertical plate extending to both sides, and is connected to the rear of one side of the side support member 411 and the inner surface of the jig body 420. The other end of the second rib 434 is bent from the one end toward one side and extends to the edge of the bottom of the other end of the jig body 420. The bottom surface of the second rib 434 is formed in an arc shape and comes into close contact with the outer surface of one side of the first body 11.

One end of the second rib 435 is formed in the shape of a vertical plate extending to both sides, and is connected to the front of one side of the side support member 411 and the inner side of the jig body 420. The other end of the second rib 435 is bent from the one end toward one side and extends to the edge of the bottom of the other end of the jig body 420. The bottom surface of the second rib 435 is formed in an arc shape and comes into close contact with the outer surface of one side of the first body 11.

One end of the second rib 435 is connected to one side of the side support member 411 located on one side of the third protrusions 415 and 416 and suppresses the deformation of the side support member 411. Accordingly, there are advantages in that the third protrusions 415 and 416 are prevented from being separated from the second groove 222*d* and the fifth groove 242*d*, respectively, in the process of lowering the jig 400 and the correct position of the locking module 200 is maintained in a process in which the jig 400 presses the locking module 200.

One end of the third rib 436 is formed in the shape of a vertical plate extending to both sides, and is connected to the rear of the other side of the side support member 411 and the inner side of the jig body 420. The other end of the third rib 436 is bent from the one end toward the other side and extends to the edge of the bottom of the other end of the jig body 420. The bottom surface of the third rib 436 is formed in an arc shape and comes into close contact with the outer surface of the other side of the first body 11.

One end of the third rib 437 is formed in the shape of a vertical plate extending to both sides, and is connected to the front of the other side of the side support member 411 and the inner side of the jig body 420. The other end of the third rib 437 is bent from the one end toward the other side and extends to the edge of the bottom of the other end of the jig body 420. The bottom surface of the third rib 437 is formed in an arc shape and comes into close contact with the outer surface of the other side of the first body 11.

One end of the third rib 437 is connected to the other side of the side support member 411 located on the other side of the third protrusions 417 and 418 and suppresses the deformation of the side support member 411. Accordingly, there are advantages in that the third protrusions 417 and 418 are prevented from being separated from the third groove 222*e* and the sixth groove 242*e*, respectively, in the process of lowering the jig 400 and the correct position of the locking module 200 is maintained in a process in which the jig 400 presses the locking module 200.

One end of the fourth rib 438 is formed in the shape of a vertical plate extending forward and backward, and is connected to the front of one side of the side support member 411 and the inner side of the jig body 420. The other end of the fourth rib 438 is bent from the one end toward the front and extends to the edge of the bottom of the other end of the jig body 420. The bottom surface of the fourth rib 438 is formed in an arc shape and comes into close contact with the outer surface of the second body 12.

One end of the fourth rib 439 is formed in the shape of a vertical plate extending forward and backward, and is connected to the center of the front surface of the side support member 411 and the inner surface of the jig body 420. The other end of the fourth rib 439 extends forward from the one end and is disposed over the second hollow 2.

One end of the fourth rib 439 is connected to the front surface of the side support member 411 located in front of the second protrusion 414 and suppresses the deformation of the side support member 411. Accordingly, there are advantages in that the second protrusion 414 is prevented from being separated from the fourth groove 242*c* in the process of lowering the jig 400 and the correct position of the locking module 200 is maintained in a process in which the jig 400 presses the locking module 200.

Therefore, when the jig 400 is lowered such that the second adhesive members 320 are attached to the top surface of the product 10 in a state in which the locking module 200, the first adhesive member 310, the second adhesive member 320, the jig 400, and the second protective member 600 are coupled to each other, the bottom surfaces of the first ribs 431, 432 and 433, the second ribs 434 and 435, the third ribs 436 and 437, and the fourth ribs 438, 439 and 440 guide the first adhesive member 310, the second adhesive member 320, and the locking module 200, to be attached to the product 10, to the attachment positions thereof while coming into close contact with the outer surface of the product 10.

According to one embodiment disclosed herein, the locking module is attached to a product composed of first and second bodies that are movably connected to be selectively spaced apart from each other and disposed close to each other, and increases the fastening force between the first and second bodies, so that there is the advantage of improving fastening stability while reducing the burden of increasing the volume and weight of the product.

Furthermore, the locking module is configured such that the first and second fixing members disposed outside the first and second bodies are connected to each other in a state in which the first and second bodies are disposed close to each other and cover the inner deformation space from foreign materials, so that there are advantages in that the operation of the first fastening member is smooth and the fastening or separating operations of the first and second bodies is smooth.

Furthermore, the locking module attachment device attaches the first and second locking units to the tops of the first and second bodies while pressing the edge portion of the locking module through the jig, so that there is an advantage in that the attaching force between the locking module and the product is improved.

Furthermore, the jig included in the locking module attachment device comes into close contact with the product and attaches the first and second locking units, fastened to each other, to specific positions of the first and second bodies, respectively, in the process of descending, so that there is the advantage of being able to attach the locking module to the product accurately and conveniently.

In addition, since the effects of the present invention are naturally exhibited by the above-described configurations regardless of whether the present inventor recognizes them, the above-described effects are merely a few effects based on the foregoing descriptions, and it should not be recognized that the present inventor has described all the effects that have been figured out or are present.

In addition, the effects of the present invention should be further determined by the overall description of the specification. Even when an effect is not described in an explicit sentence but it can be recognized through the present specification by a person skilled in the art to which the present disclosure pertains, it should be regarded as the effect described in the present specification.

Although the embodiments of the present invention have been described above with reference to the accompanying drawings, the embodiments described in the present specification and the configurations shown in the drawings are only examples of the present invention, but do not represent all the technical spirit of the present invention. Accordingly, it should be understood that there may be various equivalents and modifications that can replace the embodiments at the time when the present application is filed. Therefore, the embodiments described above should be understood as illustrative and not limitative in all respects. The scope of the present invention is defined by the following claims rather than the detailed description. All changes or modifications derived from the meanings and scopes of the attached claims and their equivalents should be construed as falling within the scope of the present invention.

What is claimed is:

1. A locking module attachment device configured to be used for a product that is used for storing and charging a wireless earphone, the product including a first body and a second body movably connected to a front of the first body to be selectively spaced apart from the first body or disposed close to the first body, the locking module attachment device comprising:

a locking module including a first locking unit configured such that one end thereof is configured to be attached to the first body, and a second locking unit configured such that one end thereof is configured to be attached to the second body and another end of the second locking unit is detachably coupled to another end of the first locking unit; and a jig configured such that one end thereof is configured to be detachably coupled to portions of upper edges and side surfaces of the first and second locking units and another end of the jig is extending downward from the one end of the jig to surround the first and second bodies;

wherein the jig is configured to guide the first and second locking units, coupled to each other, to be attached to specific positions of the first and second bodies adjacent to each other while coming into close contact with the first and second bodies, wherein the first locking unit has a first fixing member configured to be attached to the first body, wherein the first fixing member is configured such that an upper portion of an outer edge thereof is tapered and forms a first inclined surface, the first fixing member having a first side surface having at least one groove configured to be inserted with a portion of the jig, wherein the first side surface is disposed beneath the first inclined surface, wherein the second locking unit has a second fixing member configured to be attached to the second body, wherein the second fixing member is configured such that an upper portion of an outer edge thereof is tapered and forms a second inclined surface, the second fixing member having a second side surface having at least one groove configured to be inserted with a portion of the jig, wherein the second side surface is disposed beneath the second inclined surface, and wherein the jig comprises:

a pressing part configured such that a bottom surface thereof has a shape surrounding the locking module to form a plane with bottom surfaces of the first and second fixing members, a portion of an upper end of an inner surface of the pressing part protrudes and is configured to come into close contact with the first and second inclined surfaces, and the inner surface has at least one protrusion configured to be inserted into the at least one groove of the first and second side surfaces;

a jig body extending downward from an outside of the pressing part, the jig body being configured to surround the first and second bodies; and a guide part having a bottom surface configured to come into close contact with the first and second bodies together with the bottom surface of the pressing part.

2. The locking module attachment device of claim 1, wherein the first fixing member is configured such that portions of sides of a center thereof are bent forward and surround both sides of a deformation space.

3. The locking module attachment device of claim 2, wherein the first locking unit further comprises:

a first fastening member configured such that one end thereof is connected to a top of a front surface of the first fixing member, another end thereof is spaced apart from the first fixing member at the one end and extends into the deformation space, the another end having a first protrusion protruding upward.

4. The locking module attachment device of claim 3, wherein:

the second fixing member is configured such that portions of sides of a center thereof are bent rearward and is configured to be coupled to the first fixing member in a state in which the first and second locking units are coupled to each other to surround the deformation space.

5. The locking module attachment device of claim 4, wherein the second locking unit further comprises:

a second fastening member configured to be connected to the second fixing member and extend rearward, the second fastening member having a second protrusion protruding downward.

6. The locking module attachment device of claim 1, further comprising a first protective member configured to protect a bottom surface of an adhesive member disposed on a bottom surface of the locking module.

7. The locking module attachment device of claim 1, further comprising a second protective member configured to protect a bottom surface of an adhesive member disposed on a top of the jig.

* * * * *